Aug. 22, 1944.    R. LANG ET AL    2,356,598
OPERATING MECHANISM FOR CLUTCHES
Filed July 2, 1941    3 Sheets-Sheet 1

Inventors:
Richard Lang
Karl Maybach
By Edmund H. Parmalee
Attorney

Aug. 22, 1944.   R. LANG ET AL   2,356,598
OPERATING MECHANISM FOR CLUTCHES
Filed July 2, 1941   3 Sheets-Sheet 2

Inventors:
Richard Lang
Karl Maybach
By Edmund W. Purazk
  Attorney

Aug. 22, 1944.　　　　R. LANG ET AL　　　　2,356,598
OPERATING MECHANISM FOR CLUTCHES
Filed July 2, 1941　　　3 Sheets-Sheet 3

Inventors:
Richard Lang
Karl Maybach
By Edmund W. Perry
　　　Attorney

Patented Aug. 22, 1944

2,356,598

UNITED STATES PATENT OFFICE 2,356,598

OPERATING MECHANISM FOR CLUTCHES

Richar Lang, Ravensburg, and Karl Maybach, Friedrichshafen, Germany; vested in the Alien Property Custodian Application July 2, 1941, Serial No. 400,816
In Germany June 10, 1940

8 Claims. (Cl. 121—38)

Our invention relates to operating mechanisms for clutches and has special reference to double-acting clutches as they are often used in change speed gears of motor vehicles. In many cases such clutches are operated by means of fluid pressure and springs are provided which are set under tension, such tension vanishing only after the shifting of the respective clutch member was performed.

Generally such operating mechanisms are used in change speed gears of big motor cars having many different speeds and because of the large dimensions of such mechanisms it is difficult to have sufficient space for them as they make the entire transmission bulky and complicated.

Our invention simplifies these conditions as it makes possible to provide the springs to be tensioned without affording additional space, so that even greater spring forces are allowable, if desired, than usual.

According to our invention, the spring or springs are placed inside of the fluid pressure cylinder and are situated between the member (piston) on which the pressure fluid presses and the member which acts on the shiftable clutch element. The arrangement is so that on the first member being moved by fluid pressure the second member remains at rest—the spring being further compressed—until special circumstances allow for the second member to move also, whereby the tension of the spring is reduced again.

It is advisable, according to our invention, to provide a rod connected with the shiftable clutch member and to have two piston halves inside of the fluid pressure cylinder, said piston halves being slidably mounted on said rod. The rod has two fixed stops against which the spring or springs bears or bear, preferably by means of rings.

Our invention is applicable to simple or to double acting claw clutches as well as to shiftable gears. It is also of advantage with claw couplings having synchronising devices.

Having given a general description of our invention we now want to point it out more in detail having reference to the drawings which represent several examples embodying our invention.

Figure 1:
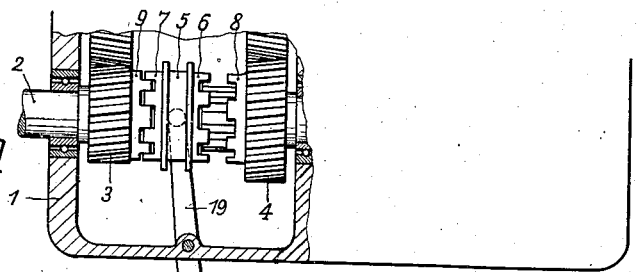
Figure 2:
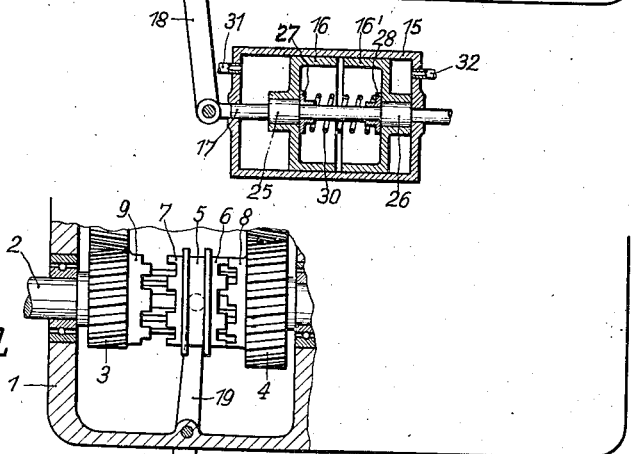
Figure 3:
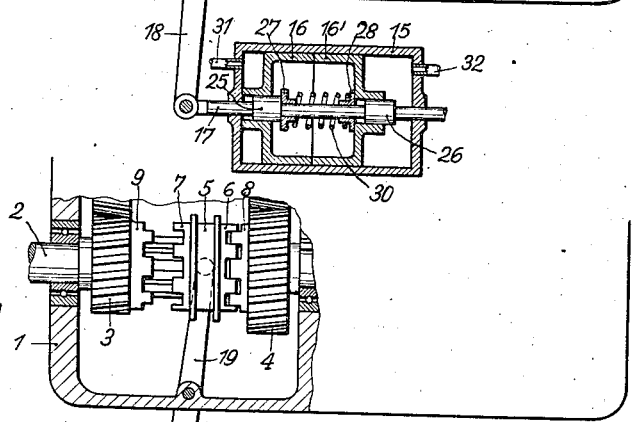
Figure 9:
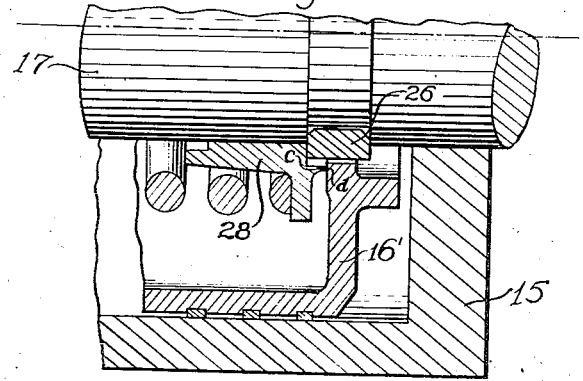

Figs. 1, 2 and 3 relate to one example, showing different positions of the members and elements. Fig 4, Fig. 5, Fig. 6 and Fig. 7 show four other examples. Fig. 8 represents a form of construction of a tightening surface between the spaces separated by the piston, on enlarged scale. Fig. 9 is an alternative construction of the showing in Fig. 8.

In all of the figures the operating mechanism is shown in longitudinal section.

In the gear casing 1 shaft 2 is situated on which gears 3 and 4 are loosely journaled. Sleeve 5 is splined to shaft 2 and adapted to be shifted longitudinally thereon so that claw teeth 6 and 7, alternately, may get into engagement with claws 8 and 9, respectively, provided on the side faces of gears 4 and 3, respectively. Double-armed lever 19/18 serves for shifting sleeve 5. The lower end of this lever is connected to rod 17 to which the two halves 16 and 16' of a piston belong which is adapted to slide inside of fluid pressure cylinder 15. Piston rod 17 has fixed stops 25 and 26 secure thereto and adapted to slide tightly inside of adequate borings in piston halves 16 and 16', respectively. There are rings 27 and 28 slidable on rod 17 between stops 25 and 26, against which the ends of spring 30 bear. Fluid pressure conduits 31 and 32 are adapted to allow pressure fluid to enter cylinder 15 alternately from one or the other side, so as to shift piston halves 16 and 16' to the right or to the left and back again, as circumstances may afford. The control valve for the pressure fluid is not represented.

In the positions represented in Fig. 1 gear 3 by means of claw coupling 7/8 is connected to shaft 2. If it is desired to disengage this connection and to cause gear 4 to be connected to shaft 2 instead of gear 3, sleeve 5 must be shifted to the right so as to cause engagement of claw coupling 6/9. For this purpose it is necessary to cause pressure fluid to enter cylinder 15 through conduit 32 and to allow for the pressure fluid to the left of piston half 16 to escape through conduit 31. Thus, piston half 16' moves to the left, presses on piston half 16, and both halves together move to their left hand end position. As during this time the side faces of the claws of coupling 7/8 are still transmitting a turning moment this coupling will not disengage and sleeve 5 will not move, so that lever 19/18 and rod 17 still rest in the position represented in Fig. 1 while the piston halves 16 and 16' have already reached the position shown in Fig. 2. Consequently, spring 30 is under additional tension, as ring 27 bearing against stop 25 remains at rest whereas ring 28 bearing against stop 26 is shifted to the left by piston half 16'.

As soon as the side faces of the claws of clutch 7/8 are released, for example by taking the gas off the engine to which the change speed gear—part of which is shown—belongs, the enlarged pressure of spring 30 will cause disengagement of clutch 7/8 and move sleeve 5 to the right until the front faces of the claws of clutch 6/8 get into touch. This position is shown in Fig. 2.

When the claw teeth have come to a mutual position in which teeth and gaps allow for engagement of clutch 6/8 spring 30 will cause sleeve 5 to move further to the right and thus cause engagement, after which the position shown in Fig. 3 is reached.

In similar manner the re-engagement of coupling 7/9 is attainable by allowing pressure fluid to escape through conduit 32 while pressure fluid is fed through conduit 31.

Figure 4:
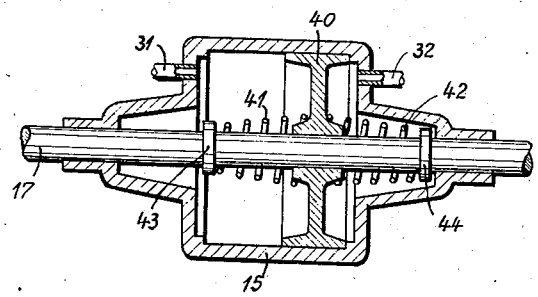

In the example represented in Fig. 4 conditions are similar to the first example, only one double-faced flat piston 40 is made use of instead of piston halves 16 and 16'. This makes it necessary to provide two springs 41 and 42 which are situated between piston 40 and stops 43 and 44, respectively.

Figure 5:
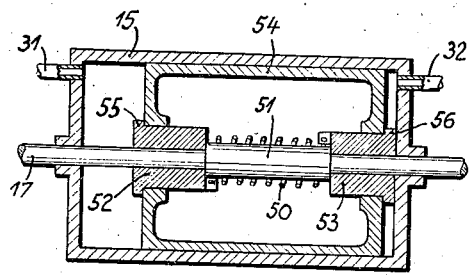

In the examples described above the springs 30, 41 and 42 are assumed to be compression springs, whereas in the example shown in Fig. 5 spring 50 is a tension spring. The middle portion 51 of rod 17 is made with a larger diameter, and the rings on the rod 17 are shaped into sleeves 52 and 53 connected to spring 50 and respectively engageable with the shoulders at the opposite ends of the enlarged middle rod portion 51, and having collars 55 and 56, respectively, bearing against the front faces of the double-faced piston 54.

Figure 6:
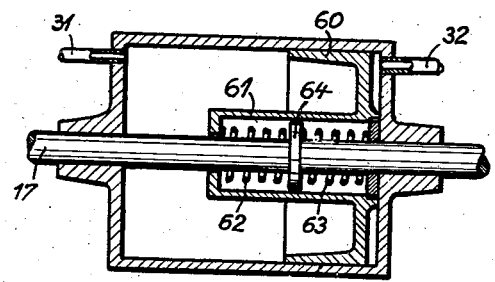

Fig. 6 is still another example in which double-faced piston 60 has a cylindrical hollow hub projection 61 inside of which compression springs 62 and 63 are situated, separated by double-acting stop 64 fixed to rod 17.

Figure 7:
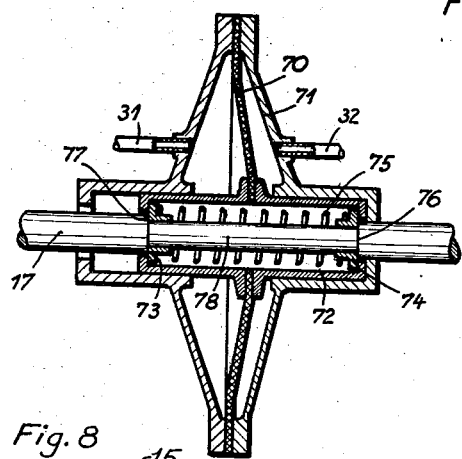
Figure 8:
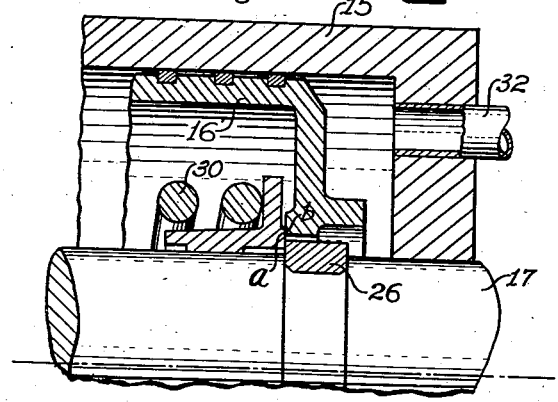

In the example represented in Fig. 7 a diaphragm 70 is used on the opposite sides of which the fluid pressure is brought to act alternately. The casing 71 is adequately shaped and the diaphragm in its centre portion is connected to a cylindrical hollow hub member 72 surrounding the spring 75 which bears against rings 73 and 74. The path of these rings sliding on the reduced middle portion 78 of rod 17 is limited by stops 76 and 77 formed as shoulders on the rod at the spots where the diameter changes from the thinner middle portion to the thicker main portions.

Figs. 8 and 9 represent two examples of tightening surfaces. Both relate to the construction shown in Figs. 1, 2 and 3.

It is important that the pressure fluid should not leak through between the rod 17 or the stop 26 and the ring 28, which may happen when the entire device is made small, so as to save in space, and the spring 30 is weak. It then becomes possible that the pressure on the ring 28 causes this ring to move away from the bottom of piston 16' which should be avoided. Therefore, the tightening surfaces a/b and c/d, respectively, are made comparatively narrow so that the specific tightening pressure is very high.

We do not want to be limited to the details described or shown in the drawings as many variations will occur to those skilled in the art without deviating from the scope of our invention as defined by the appended claims.

What we claim is:

1. A fluid pressure operated device for change speed gears comprising a casing, a rod adapted to operate a change speed gear mounted for axial movement in the casing, fluid pressure operated means in said casing slidably mounted on said means in both directions to the ends of the casing independently of the rod, spring means interposed between said rod and said fluid pressure operated means and positioned to store up energy throughout a movement of the fluid pressure operated means in each direction and becoming operating when the fluid pressure operated means is in its respective end positions to shift the operating rod.

2. A fluid pressure operated device for change speed gears comprising a casing, a rod adapted to operate a change speed gear mounted for axial movement in the casing, fluid pressure operated means in said casing slidably mounted on said rod for movement in both directions to the ends of the casing independently of the rod, spring means connected to said fluid pressure operated means, actuatable by and storing up energy in response to each movement of the fluid pressure operated means in each direction, stop means on the rod engaged by the spring means during movement of the fluid pressure operated means in each direction and becoming operative when the fluid pressure operated means is at the ends of the casing under the stored up energy of the spring means to shift the rod.

3. A fluid pressure operated device comprising a closed casing, a rod adapted to operate a change speed gear mounted for axial movement in the casing, a double acting piston in said casing slidably mounted on said rod for movement independently thereof in both directions to the ends of the casing independently of the rod, stop means on the rod, spring means interposed between the piston and the stop means storing up energy in response to each movement of the piston in each direction and acting through said stop means upon release of its stored up energy when the piston reaches either end of the casing, and means for supplying fluid pressure for moving the piston in opposite directions in the casing.

4. A fluid pressure operated device comprising a closed casing, a rod adapted to operate a change speed gear mounted for axial movement in the casing, piston means in the casing slidably mounted on said rod for movement by fluid pressure in both directions to the ends of the casing, said piston means having a hollow interior portion surrounding the rod, stop means on the rod, and spring means interposed between said piston means and said stop means in said hollow interior portion storing up energy in response to each movement of the piston means in each direction and acting through the stop means when the piston means is in its respective end positions to shift the rod.

5. A fluid pressure operated device comprising a closed casing, a rod adapted to operate a change speed gear mounted for axial movement in the casing, piston means in the casing slidably mounted on said rod for movement by fluid pressure in both directions to the ends of the casing independently of the rod, said piston means having a hollow interior portion surrounding the rod, rings in said hollow portion slidable on the rod and adapted to engage the opposite ends of the piston means, stop means on the rod adapted to be engaged by said rings, and spring means interposed between said rings and surrounding the rod adapted to store up energy upon movement of the piston means in each direction and becoming operative when the piston means is at either end of the casing upon release of the stored up energy to shift the rod.

6. A fluid pressure operated device comprising a closed casing, a rod adapted to operate a change speed gear mounted for axial movement therein, a double acting integral piston in said casing slidably mounted on said rod for movement by fluid pressure in both directions to the ends of the casing, a pair of stops on the rod located on opposite sides of, and in spaced relation to the piston, and spring means interposed between the respective stops and the piston adapted to be compressed to store up energy, respectively, during movement of the piston in each direction and being expansible to actuate the rod when the piston is at either end of the casing.

7. A fluid pressure operated device comprising a closed casing, a rod adapted to operate a change speed gear mounted for axial movement therein, a piston in said casing slidably mounted on said rod for movement by fluid pressure independently of the rod, a stop on the rod, a loose ring on the rod seating against said stop and adapted to be engaged by the piston and shifted thereby away from the stop, a spring on the rod interposed between the ring and a second stop on the rod and tending to hold the ring in bearing engagement with the first stop, and narrow interengaging surfaces on the ring and the piston surrounding the rod adapted to provide a fluid tight seal between the ring and piston.

8. In a change speed gear having a double acting claw clutch movable in opposite directions to alternately render operative different gear selections, a servo clutch operator comprising a closed casing, a rod mounted for axial movement in the casing and operatively connected with the clutch, a double acting piston in the casing slidably mounted on said rod for movement in opposite directions by fluid pressure, spring means interposed between the said rod and the said piston storing up energy in response to each movement of the piston in each direction and becoming operative when the piston is at either end of the casing to shift the said rod.

RICHARD LANG.
KARL MAYBACH.